United States Patent [19]

Mullins

[11] 4,112,782
[45] Sep. 12, 1978

[54] COMPATIBLE GEAR SYSTEM

[76] Inventor: Max Mullins, c/o Mrs. Nel Mullins, 1370 NE. Miami Court, Miami, Fla. 33161

[21] Appl. No.: 808,469

[22] Filed: Jun. 21, 1977

[51] Int. Cl.² ............................................. F16H 55/06
[52] U.S. Cl. ................................................. 74/462
[58] Field of Search .......................... 74/462, 460, 157

[56] References Cited

U.S. PATENT DOCUMENTS

| 1,005,464 | 10/1911 | Phelps | 74/462 X |
| 1,833,159 | 11/1931 | Garnett | 74/462 |

*Primary Examiner*—Leonard H. Gerin
*Attorney, Agent, or Firm*—Gustave Miller

[57] ABSTRACT

This is a compatible gear system and consists of providing an odd number of teeth on each gear, a minimum of five or more. The size and shape of the gear and its teeth are determined by laying out a regular polygon having an odd number of sides, corresponding to the number of desired gear teeth with the distance from the center of the regular polygon equal to the pitch radius of the desired gear. Then a circle is drawn about each polygon corner with a radius equal to one-fourth of the side of the polygon, this series of circles determining the shape and size of the gear teeth. Next, an intermediate series of circles is provided with their centers at the midpoint of the polygon sides and, of necessity, the intermediate circles are tangent to the teeth determining circles. Lines drawn through the points of tangency between each intermediate circle and the adjacent corner circles are necessarily parallel. The outer portions of the corner circles determine the size and shape of the teeth, and the inner portions of the intermediate circles determine the depth of the gear teeth meshing recesses between the teeth.

In addition, slight clearances are provided at the tips of the teeth, the clearances being at right angle to a pitch radius extended therethrough. These clearance edges may be a straight chord in the tooth circle, or may be a rounded edge, and, in either case, permit better lubrication. The gears thus made are greater in strength, durability and much more efficient in transmitting power than conventional gears.

6 Claims, 2 Drawing Figures

COMPATIBLE GEAR SYSTEM

SUMMARY OF THE INVENTION

This invention is a Gear System providing gear and gear teeth that are more efficient, much stronger, more endurable and can transmit much more power than conventional gear systems. The gears of this system always have an odd number of teeth, five or more, and will mesh with similar gears having the same number of teeth, or with similar gears having an odd number of teeth as set forth in the table set forth in this specification. The teeth are more than semi-circular and merge with semi-circular recesses of the same diameter and thus mesh together readily. To facilitate lubrication, each tooth has a small clearance at its tip.

OBJECTS OF THIS INVENTION

It is an object of this invention to provide a gear system more efficient, much stronger and more durable than conventional systems.

A further object of this invention is to provide a gear system wherein each gear has an odd number of teeth, five or more.

Yet a further object of this invention is to provide an efficient gear system wherein each gear of this system may have the same odd number of teeth or where meshing gears may have different odd numbers of teeth in accordance with the table hereinafter set forth in the specification.

A still further object of this invention is to provide gears that are greater than semi-circular and semi-circular meshing recesses spacing the teeth equally apart so that cooperating meshing teeth will mesh most efficiently.

Yet a further object of this invention is to provide gear teeth having a clearance cut at its tip at right angles to its extended pitch radius.

A still further object of this invention is to provide a gear system having partly circular teeth meshing into semi-circular recesses.

BRIEF DESCRIPTION OF THE FIGURES

With the foregoing and other objects in view, this invention comsprises the combinations, constructions and arrangements of parts, hereinafter set forth, claimed and disclosed in the accompanying drawing, in which:

DETAILED DESCRIPTION OF THE INVENTION

Figure 1:
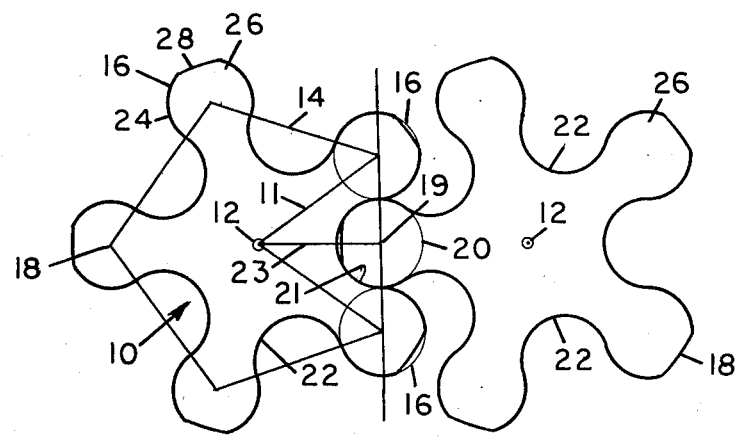
FIG. 1 is a diagrammatatic view showing how the gear is laid out.

There is shown at 10 a regular five-sided polygon, or pentagon, wherein the distance 11 from its center 12 is equal to the pitch radius of the desired gear. Then, with a radius equal to one-fourth of a side 14 of the polygon, a circle 16 is drawn about each polygon corner 18. Next, an intermediate circle 20 is drawn about the midpoint 19 of each side 14 tagent to the adjacent corner circles 16 and thus with the same radius as that of the corner circles 16, and lines drawn through the points of tangency between each intermediate circle 20 and the adjacent corcner circles 16 are necessarily parallel to each other.

The semi-circle portion 21 of each intermediate circle inside the polygon 10 thus lays out the tooth meshing recess 22 in the gear, while the portions 24 of the corner circles 16 outside of the polygon sides 14 lay out the shape and size of the gear tooth 26 that will compatibly mesh into the meshing recess.

To facilitate retaining lubrication about the gear teeth 26 and the meshing recesses 22, a clearance cut 28 of a reasonable small size is provided at the tips of the teeth 26. This clearance cut has its center in the extended pitch radius 11 extending beyond the polygon corner 18 of corner circle 16. This clearance cut 28 may be either a straight chord of the corner circle 16, or may be slightly curved, to merge better into the corner circle 16.

The distance between the meshing gear centers 12 is equal to the length of the pitch radius 11 plus the distance 23 from a gear center 12 to the center 19 of an intermediate circle 20.

The compatible gear teeth 26 of this invention, as already disclosed, must be an odd number, five or more, and both gears may have the same odd number of teeth as shown in FIG. 1.

Figure 2:
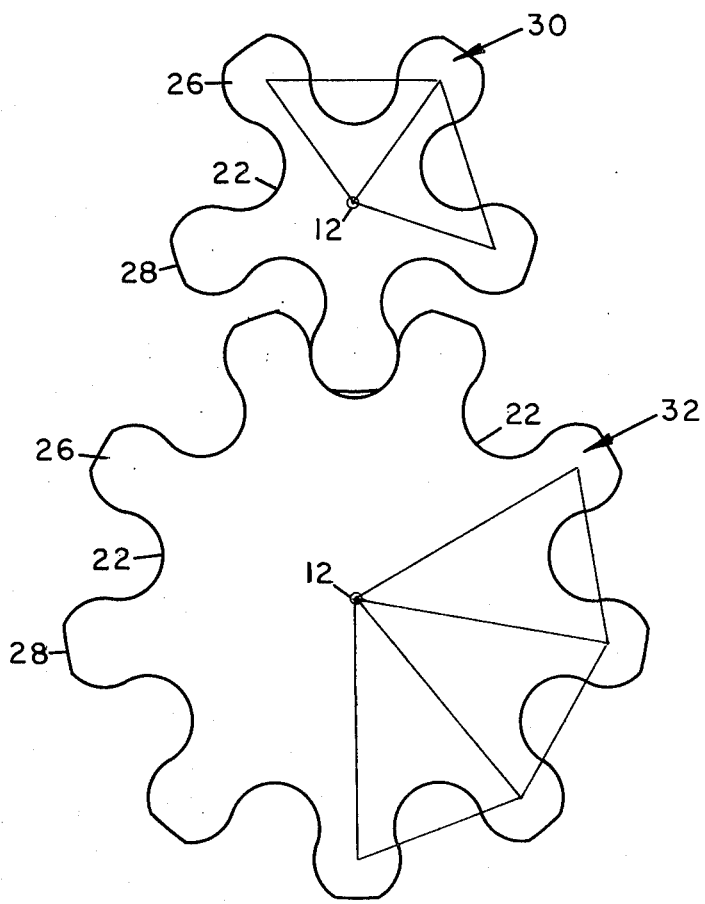
FIG. 2 shows two meshing gear of different odd numbers of teeth according to this invention.

If an unequal odd number of teeth is desired in the meshing compatible gears, such as give teeth meshing with nine teeth, as in the five-tooth gear 30 in FIG. 2 meshing with the nine-tooth gear 32, then the odd number of teeth in each gear must conform with the following table if the teeth are to remain compatible.

TABLE one gear meshes with the other gear 5 teeth fit 5 or 9, 17, 21, 25; then increase by 4's indefinitely 7 teeth fit 7 or 13, 25, 31, 37; then increase by 6's indefinitely 9 teeth fit 9 or 17, 33, 41, 49; then increase by 8's indefinitely 11 teeth fit 11 or 21, 41, 51, 61; then increase by 10's indefinitely 13 teeth fit 13 or 25, 49, 61, 73; then increase by 12's indefinitely 15 teeth fit 15 or 29, 57, 71, 85; then increase by 14's indefinitely 17 teeth fit 17 or 21, 25, 29, 33; then increase by 4's indefinitely 19 teeth fit 19 or 23, 27, 31, 35; then increase by 4's indefinitely, thereafter, continuing downwardly by 2's in the first two columns, and increasing horizontally by 4's indefinitely.

ABSTRACT OF THE DRAWING

In the drawing, like numbers refer to like parts, and for the purposes of explication, marshalled below are the numbered parts of the improved COMPATIBLE GEAR SYSTEM of this invention.

10 five sided polygon
11 pitch radius distance from center of 10 to 18
12 center of 10 and of completed gear
14 side of polygon
16 corner centered circles
18 corners of 10
19 mid-point of 14
20 intermediate circles
21 inside portion of 20
22 meshing recess
23 distance from 12 to 19
24 outside portion of 16 laying out tooth 26
26 gear tooth 28 clearance cut
30 five-tooth gear in FIG. 2
32 nine-tooth gear in FIG. 2

Although this invention has been described in considerable detail, such description is intended as being illustrative rather than limiting, since the invention may be variously embodied.

Having thus set forth and disclosed the nature of this invention, what is claimed is:

1. A compatible gear system wherein each gear (30, 32) has an odd number of teeth (26), five or more, the shape and size of the gear (30, 32) and gear teeth (26) being determined by laying out a regular polygon (10) with its corners (18) a pitch radius distance (23) from its center (12), thus being the pitch radius of the desired gear (30, 32), the polygon (10) having an odd number of sides (14) equal to the odd number of teeth (26) in the desired gear (30, 32), laying out circles (16) about each polygon corner (18) with a radius equal to one-fourth of the length of a polygon side (14), then laying out intermediate circles (20) tangent to and between said polygon corner centered circles (16) with the same radius, the intermediate circles (20) each being centered at the mid-points (19) of its polygon side (14), the corner centered circles (16) defining gear teeth (26) that are greater than semi-circular and merge inwardly with the inner portions (21) of the intermediate circles (20) which define semi-circular gear teeth meshing recesses (22).

2. The gear system of claim 1, each gear tooth (26) having a slight clearance cut (28), the center of the cut (28) being at right angles to the extended pitch radius of the particular tooth (26).

3. The gear system of claim 2, said clearance cut (28) being a chord of the tooth determining circle (16).

4. The gear system of claim 1, wherein the number of teeth in one gear may be increased relative to the other gear only in accordance with the following table:
   5 teeth fit 5, or 9, or 17, or 21, or 25, increasing by 4's indefinitely;
   7 teeth fit 7, or 13, or 25, or 31, or 37, increasing by 6's indefinitely;
   9 teeth fit 9, or 17, or 33, or 41, or 49, increasing by 8's indefinitely;
   11 teeth fit 11, or 21, or 41, or 51, or 61, increasing by 10's indefinitely;
   13 teeth fit 13, or 25, or 49, or 61, or 73, increasing by 12's indefinitely;
   15 teeth fit 15, or 29, or 57, or 71, or 85, increasing by 14's indefinitely;
   17 teeth fit 17, or 21, or 25, or 29, or 33, increasing by 4's indefinitely;
   19 teeth fit 19, or 23, or 27, or 31, or 35, increasing by 4's indefinitely,
and thereafter, continuing downwardly by 2's in the first two columns in the table and increasing horizontally by 4's indefinitely.

5. A compatible gear system wherein each gear (30,32) has an odd number of teeth (26), five or more, said teeth (26) being greater than a semi-circle and spaced apart by semicircular meshing recesses of the same radius as said teeth (26), each tooth (26) having a clearance cut (28) at its tip.

6. The compatible gear system of claim 5, said clearance cut (28) being a chord of said tooth (26), said chord (28) being at right angles to the extended pitch radius (11) of said tooth (26).